Figure 3:
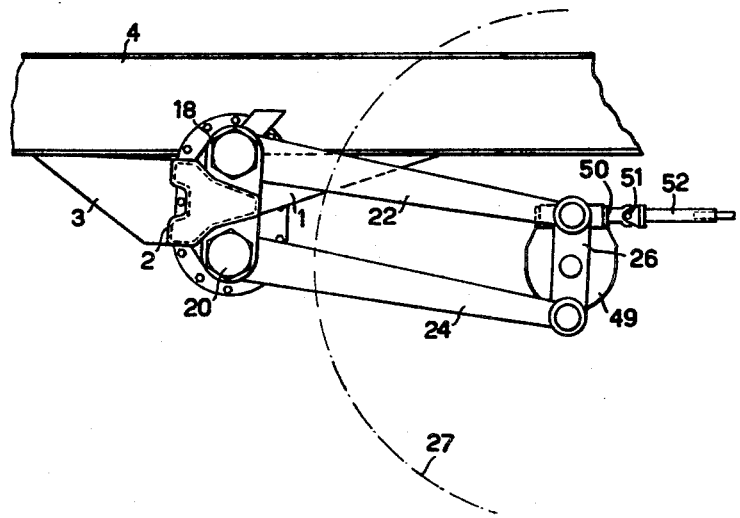

Sept. 7, 1954      H. J. VAN DOORNE      2,688,495
TORSION ROD SUSPENSION SYSTEM FOR VEHICLES
Filed April 2, 1952      7 Sheets-Sheet 1
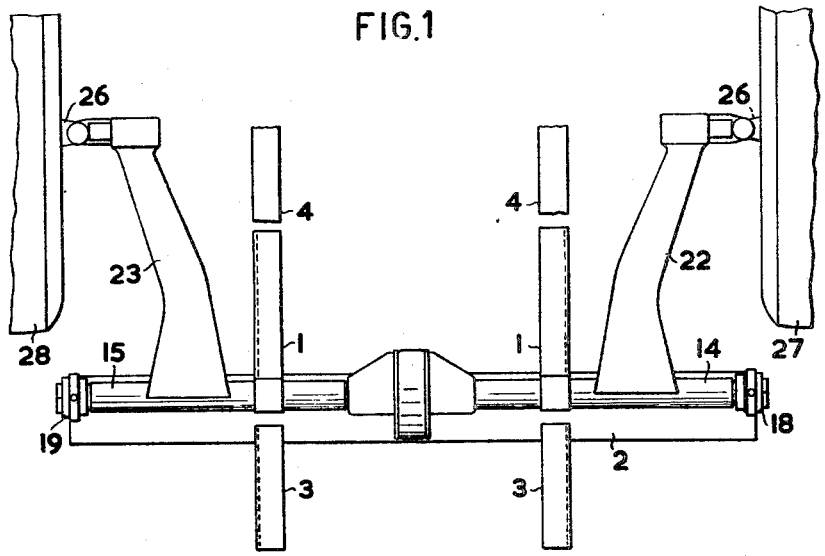
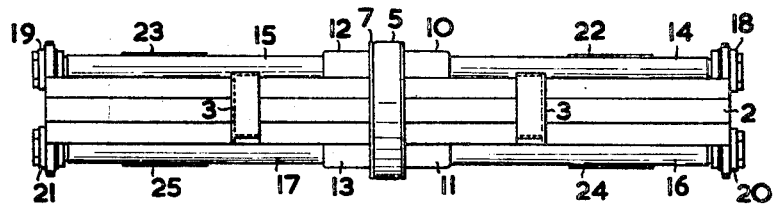
INVENTOR
H. J. Van Doorne
BY *Henderoth, Lind & Ponack*
ATTORNEYS.

Sept. 7, 1954    H. J. VAN DOORNE    2,688,495
TORSION ROD SUSPENSION SYSTEM FOR VEHICLES
Filed April 2, 1952    7 Sheets-Sheet 3
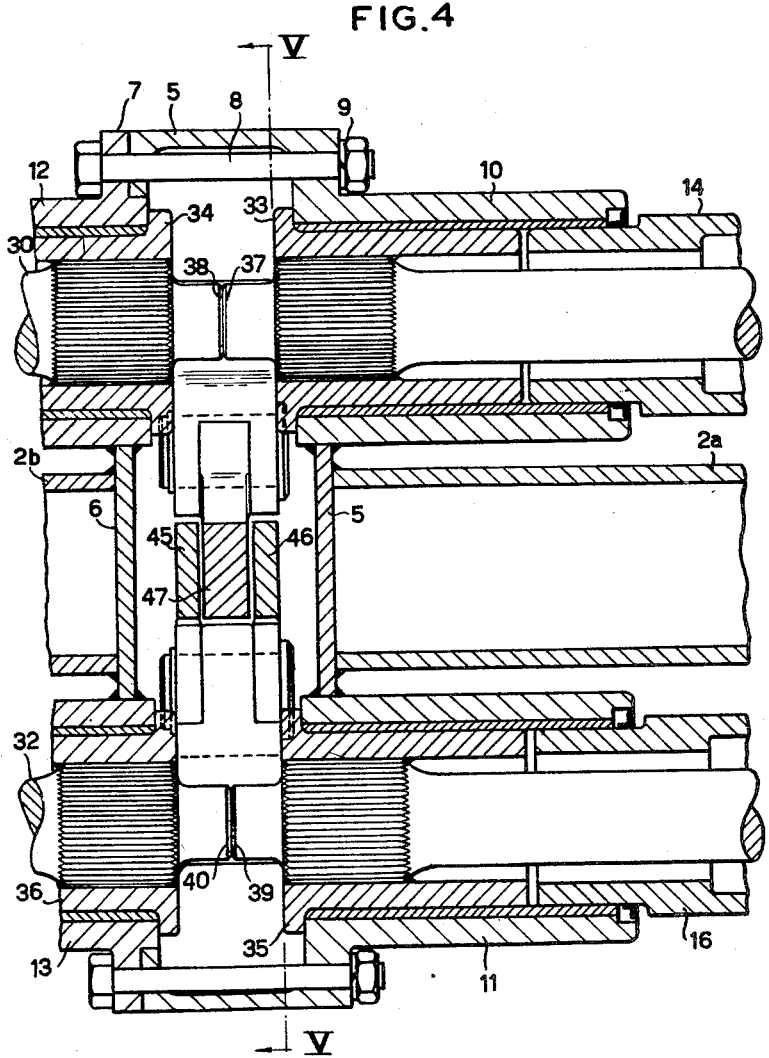
INVENTOR
H. J. Van Doorne
BY
ATTORNEYS Sept. 7, 1954 H. J. VAN DOORNE 2,688,495
TORSION ROD SUSPENSION SYSTEM FOR VEHICLES
Filed April 2, 1952 7 Sheets-Sheet 4

INVENTOR
H. J. Van Doorne

BY Henderoth, Lind + Ponack
ATTORNEYS

Sept. 7, 1954  H. J. VAN DOORNE  2,688,495
TORSION ROD SUSPENSION SYSTEM FOR VEHICLES
Filed April 2, 1952  7 Sheets-Sheet 5

INVENTOR
H. J. Van Doorne

BY Henderoth, Lind + Ponack
ATTORNEYS

Sept. 7, 1954     H. J. VAN DOORNE     2,688,495
TORSION ROD SUSPENSION SYSTEM FOR VEHICLES
Filed April 2, 1952     7 Sheets-Sheet 6

INVENTOR
H. J. Van Doorne

BY
ATTORNEYS

Patented Sept. 7, 1954

2,688,495

UNITED STATES PATENT OFFICE 2,688,495

TORSION ROD SUSPENSION SYSTEM FOR VEHICLES

Hubertus Josephus van Doorne, Deurne, Netherlands

Application April 2, 1952, Serial No. 280,135

Claims priority, application Netherlands April 5, 1951

1 Claim. (Cl. 280—104)

The invention relates to a vehicle suspension system particularly, but not exclusively, adapted to be applied to a motor vehicle designed to be used on very rough grounds, e. g. for military purposes.

An object of the present invention is to provide a vehicle the non-sprung part of which follows the unevenness of the ground to an as small as possible extent.

Another object of the invention is to provide a vehicle suspension system either for the front part or for the rear part of a vehicle which at the same time gives an efficient springing action and a compensation between the movements of the wheels at both sides of the vehicle.

Another object of the invention is to provide a suspension system for a vehicle having spring means and equalizing means combined in a unit which is easily attachable to a vehicle frame or body or detachable therefrom in order to permit speedy overhaul and repair if parts are damaged by rude use on uneven ground or by war actions.

Another object of the invention is to provide a vehicle suspension system comprising spring means and equalizing means all the moving parts of which are protected from ingress of water, mud or sand if a vehicle, e. g. a military vehicle, provided with the said suspension system has to cross rivers, canals, trenches, deserts, etc.

Another object of the invention is to provide a suspension system comprising spring means and equalizing means in which the equalizing means are enclosed in an extremely narrow casing which is to be arranged adjacent to the longitudinal centre plane of the vehicle so that the equalizing means can entirely be protected by the armor plates of a military vehicle.

Another object of the invention is to provide combined spring means and equalizing means of a design which permits two wheel arms at either side of the vehicle to be arranged one above the other in order to maintain a wheel bracket, pivotally secured to said wheel arms, in a most efficient position for driving the vehicle wheel.

Another object of the invention is to provide a vehicle suspension system comprising torsion bars which can easily be replaced from the outside in case of fracture while all torsion bars are interchangeable.

Another object of the invention is to provide a vehicle suspension system comprising equalizing means and torsion bars of such a design that in case of fracture of one of said torsion bars a vehicle provided with the said suspension system is not disabled but can be continued to be driven, although on less rough ground than it is designed for.

Figure 6:
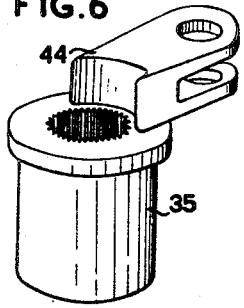
Figure 4A:
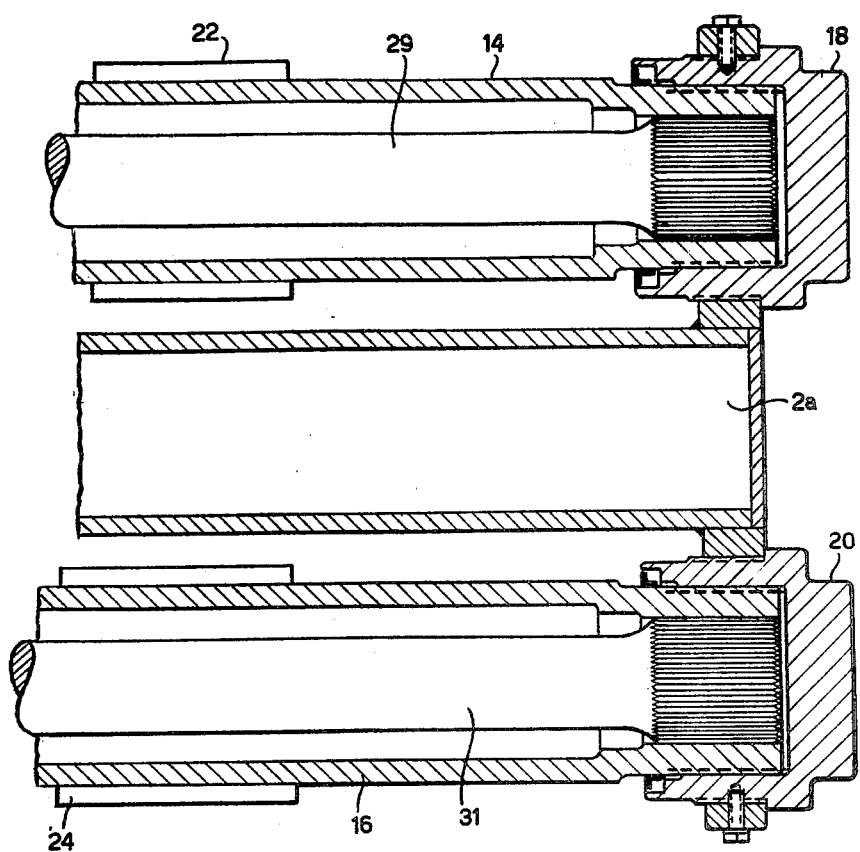
Figure 5:
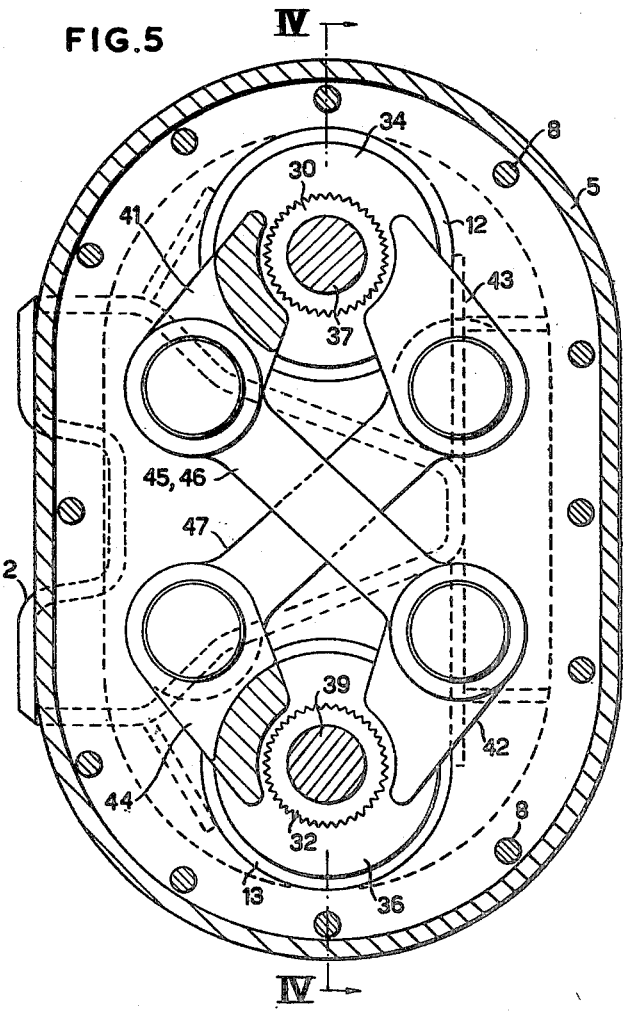
Figure 7:
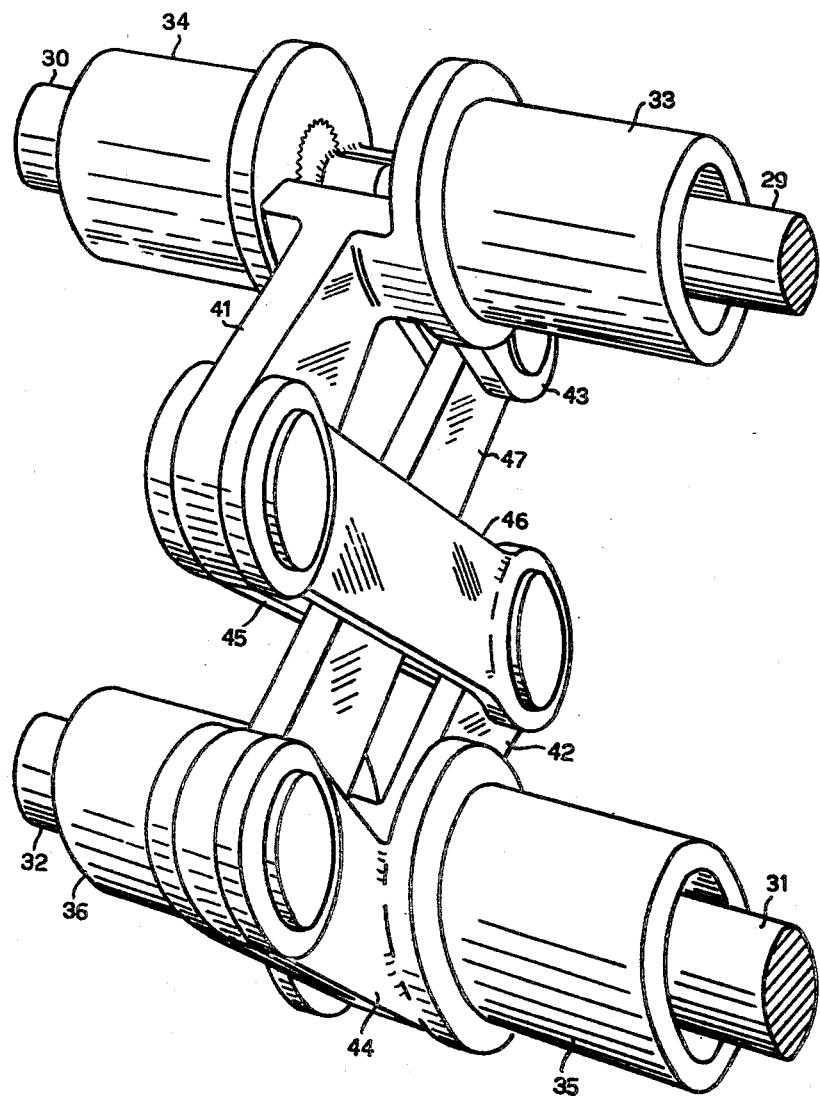
Figure 8:
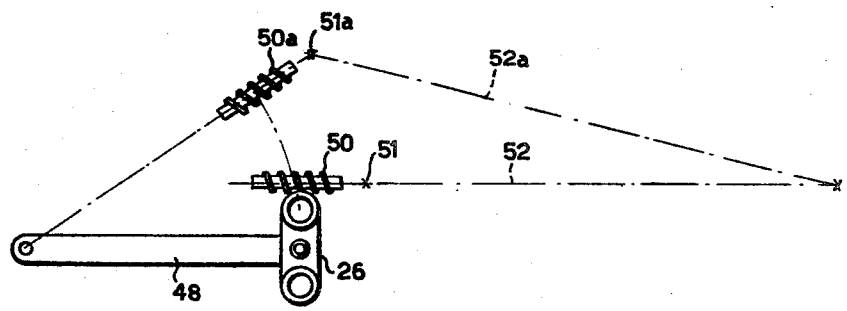
Figure 9:
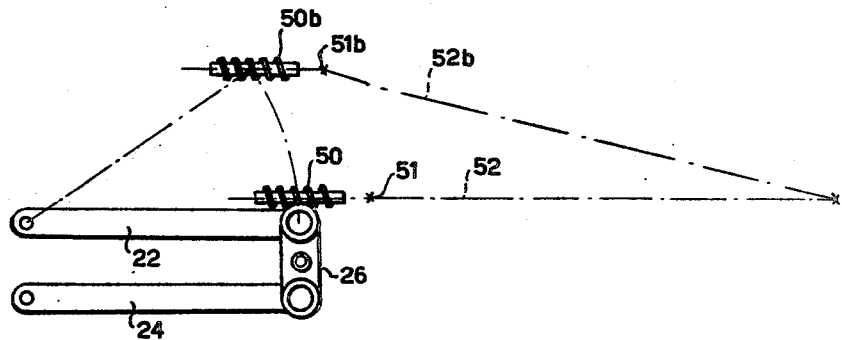

Fig. 1 is a plan view of the front portion of the frame of a vehicle in which the invention is applied to the front wheels, Fig. 2 is a front view of the portion of the vehicle shown in Fig. 1, however, without the wheels, Fig. 3 is a side elevation as viewed from the right hand side of Fig. 1, showing also driving means for one of the front wheels which is indicated by a dot-and-dash line, said driving means being omitted in Fig. 1, Figs. 4 and 4a are two parts of a vertical section in a plane transverse to the vehicle of the portion shown in Fig. 2 on a larger scale and section being indicated by the line IV—IV in Fig. 5, Fig. 5 is a vertical section according to the line V—V in Fig. 4, Fig. 6 is a perspective view of one of the parts shown in Figs. 4 and 5, Fig. 7 is a perspective view showing the way in which different parts shown in Figs. 4 and 5 are interconnected, Fig. 8 is a schematical side view of a single wheel arm provided with worm driving means of a known design, and Fig. 9 is a corresponding side view, however, with double wheel arms and worm driving means of the vehicle according to the invention.

The front suspension system shown in the drawing has brackets 1 welded to the rear of a cross beam 2 and brackets 3 welded to the front of said cross beam in the same vertical planes as the brackets 1. Longitudinal beams 4, the front portions of which are broken away in Fig. 1 in order to show the brackets 1 and 3 in plan view, are attached to said brackets. The cross beam 2 consists of two parts 2a and 2b (Fig. 4) said part 2a being welded to a central casing 5. The part 2b of the cross beam 2 is welded to a cover 6 of said casing. Bolts 8 extend through a flange 7 and through the central casing 5, said flanges and said casing being united by nuts 9 screwed on said bolts 8.

The casing 5 is provided with two bearing sleeves 10 and 11 and the cover 6 is provided with two bearing sleeves 12 and 13, all of the said four bearing sleeves being lined by a bearing bush and provided with a joint ring in order to prevent escaping of lubricating oil. The inner ends of tubes 14 and 15 are rotatable in said bearing sleeves 10 and 12 respectively and the inner ends of tubes 16 and 17 are rotatable in said bearing sleeves 11 and 13 respectively. Caps 18, 19, 20 and 21 are screwed in vertical flanges welded to the outer ends of the cross beam 2 and are locked in position by a set screw. Said caps are provided with internal screw threads in which the outer ends of said tubes 14 to 17 are screwed so that these screw threads serve as radial bearings for said tubes in order to permit oscillation while at the same time the tubes are held in axial direction with the exception of the negligible axial motion during the oscillation of the tubes.

Rearward wheel arms 22, 23, 24 and 25 are secured to said tubes 14, 15, 16 and 17 respectively at some distance from said bearing caps 18 to 21. Fig. 3 shows these wheel arms in side view while in this figure a steering swivel bracket is schematically indicated by 26, said bracket being pivotally connected to the rear ends of the arms 22 and 24. A corresponding steering swivel bracket (not shown) is pivotally connected with the rear ends of the wheel arms 23 and 25. In Fig. 1 is shown that the wheel arms are curved in order to permit the necessary movement of the steering wheels 27 and 28.

Torsion bars 29, 30, 31 and 32 are arranged within the tubes 14, 15, 16 and 17 respectively, said torsion bars engaging with their grooved extremities the correspondingly interior grooves of the outer ends of, the tubes 14 to 17. The inner ends of the torsion bars are equally grooved and engage correspondingly grooved portions of sleeves 33, 34, 35 and 36 respectively. The inner ends of the torsion bars are further provided with projections 37, 38, 39 and 40 respectively limiting the inward axial displacement by mutual contact. A small outward displacement is limited by the caps 18 to 21.

The sleeves 33 to 36 are provided with arms which extend forwardly and rearwardly relatively to the vertical lateral centre plane IV—IV in Fig. 5. The sleeve 33 is provided with a single arm 41 extending forwardly and downwardly, the sleeve 36 is provided with a single arm 42 extending rearwardly and upwardly, the sleeve 34 is provided with a fork-shaped arm 43 extending rearwardly and downwardly and the sleeve 35 is provided with a fork-shaped arm 44 extending forwardly and upwardly.

As shown in the perspective view of Fig. 7 the single arms 41 and 42 are mutually connected by links 45 and 46 arranged at both sides of these arms and pivotally connected therewith by short pins. These links thus extend from the upper front side to the lower rear side. The fork-shaped arms 43 and 44 of the sleeves 34 and 35 are mutually connected by one single link 47 and short pins. This link is enclosed between the links 45 and 46 and extends from the lower front side to the upper rear side, thus crossing said links 45 and 46. In this way a very compact compensation device is obtained which is adapted to transmit great forces and which constitutes at the same time a resilient suspension system.

It is clear that if one of the road wheels, e. g. the front wheel 27, is lifted by an unevenness of the ground, the tubes 14 and 16, viewed from the left hand side of the vehicle according to Fig. 3 are turned anti-clockwise, said movement of the tube 14 being transmitted by the torsion bar 29 to the sleeve 33, the arm 41, the links 45 and 46, the arm 42, the sleeve 36 and the torsion bar 32 to the tube 17 and thereby to the lower wheel arm 25. The movement of the tube 16 is transmitted through the torsion bar 31, the sleeve 35, the arm 44, the link 47, the arm 43, the sleeve 34 and the torsion bar 30 to the tube 15 and thereby to the upper wheel arm 23. The result of this compensation is that the front portion of the vehicle is lifted over a distance which is only the half of the vertical movement of the front wheel 27 if there would be no springing action. However, since by a sudden upward movement of the wheel the torsion bars 29 to 32 are twisted, a large part of the upward movement of the wheel is taken by the springing action.

The arrangement of the tubes of each pair 15, 17 and 14, 16 one above the other and the arrangement of the pivotal connections between the free ends of the wheel arms and the wheel swivel brackets has a special advantage if the wheel is driven and the arms move over large amplitudes which is the case in vehicles designed to be used on very uneven ground. This advantage will appear by a comparison between Figs. 8 and 9 of the drawing in which Fig. 8 represents a known design with a single wheel arm. It is supposed that in the known arrangement according to Fig. 8 a worm wheel casing is secured to the rear end of the wheel arm 48 and a worm 50 is rotatable in said worm wheel casing, said worm being driven via a universal joint 51 by a telescopic transmission shaft 52. It is clear from Fig. 8 that in the raised position of the wheel arm 48 the worm 50 has arrived in the position 50a in which the universal joint indicated by 51a, works over a large angle while the transmission shaft 52a is extended over a considerable length.

As a comparison therewith Fig. 9 represents schematically the arrangement of Fig. 3 in which the worm wheel casing 49 is secured to the wheel swivel bracket 26 which by the wheel arms 22 and 24 is guided parallel to itself. If the wheel arms 22 and 24 are raised over the same angle as the wheel arm 48 the worm has arrived in the position 50b which is parallel to the original position indicated by 50. It follows from the drawing that the universal joint 51 arrived in the position 51b has to transmit the drive over a much smaller angle in comparison with Fig. 8 while the transmission shaft in the position 52b is also extended to a much less degree.

The suspension system described in the foregoing description may be applied either to the front wheels or to the rear wheels. If, however, it would be applied to the front wheels as well as to the rear wheels the stability of the vehicle would get lost. Instead of single wheels it would also be possible to use tandem wheels mounted on longitudinally swivelling yokes which are pivotally connected to the brackets 26.

The suspension system according to the invention has several advantages. The whole system comprising the described equalizing means and spring means can be attached as a unit to a vehicle frame or body or detached therefrom if this is necessary for repairs or for replacement of damaged parts. Further the central position of the equalizing means permits an efficient protection by armour plates of an armoured car. Smaller repairs can be carried out while leaving the cross beam 2 fixed in its place since replacement of a damaged torsion bar is made possible by unscrewing the corresponding cap. If e. g. the torsion bar 29 is broken the cap 18 is screwed out after removing the lock screw. The wheel arm 22 is detached from the wheel bracket 26 and is swung upwardly, after which the tube 14 can be passed through the hole of the flange from which the cap 18 has been removed, until the wheel arm 22 abuts against said flange. In this way the tube 14 leaves the sleeve 10 sufficiently to reach the broken torsion bar, the outer portion of which can be pushed out through the outer end of the tube 14 while the inner portion of said torsion bar can either be removed (if it is a short piece) between the sleeve 10 and the tube 14, or (if it is a longer piece) can be pushed to the right and be removed through the open end of said screw.

Another advantage of the suspension system according to the invention resides in the fact that a fracture of one of the torsion bars does not disable the vehicle. If one of the torsion bars, e. g. torsion bar 29 breaks, the torsion bars 29 and 32 are put out of action, so that the wheel arms 22 and 25 are no longer supported. The torsion bars 30 and 31 must, in that case, support the front part of the vehicle, so that the vehicle may be driven home, although carefully.

Having now described one embodiment of the vehicle suspension system according to the invention and having indicated in which way modifications may be applied without leaving the principle of the invention, what I claim is:

In a vehicle suspension system a central casing, two pairs of tubes extending from said casing in lateral direction relative to the vehicle, one tube of each pair lying above the other, the inner ends of all tubes being rotatably supported in said casing, the outer ends of all tubes being rotatably supported by a fixed part of the vehicle, a wheel arm fixedly secured in an intermediate position to each of said tubes, a torsion bar in each of said tubes, the outer end of each torsion bar being anchored to the outer end of the corresponding tube, the inner end of each torsion bar being rotatably supported in said casing and being provided with an arm within said casing, the arm of the lower torsion bar of one pair of tubes being connected to the arm of the upper torsion bar of the other pair of tubes by link means which crosses link means connecting the arm of the lower torsion bar of the last-mentioned pair of tubes to the arm of the upper torsion bar of the first-mentioned pair of tubes.

References Cited in the file of this patent

UNITED STATES PATENTS

| Number | Name | Date |
|---|---|---|
| 2,457,583 | McCaslin | Dec. 28, 1948 |
| 2,607,610 | Allison | Aug. 19, 1952 |

FOREIGN PATENTS

| Number | Country | Date |
|---|---|---|
| 457,089 | Great Britain | Nov. 20, 1936 |
| 529,192 | France | Sept. 3, 1921 |